United States Patent
Ogata et al.

(10) Patent No.: US 7,473,382 B2
(45) Date of Patent: Jan. 6, 2009

(54) SEAL MOLDING MATERIAL FOR CELL ELECTROLYTIC SOLUTION

(75) Inventors: Chiyota Ogata, Aso-Machi (JP); Hidekazu Kanagae, Aso-Machi (JP); Hideto Nameki, Aso-Machi (JP); Hisayuki Nagaoka, Saga (JP); Kuniyoshi Kawasaki, Fujisawa (JP)

(73) Assignee: NOK Corportion, Tokyo (JP)

( * ) Notice: Subject to any disclaimer, the term of this patent is extended or adjusted under 35 U.S.C. 154(b) by 0 days.

(21) Appl. No.: 12/082,726

(22) Filed: Apr. 14, 2008

(65) Prior Publication Data

US 2008/0193839 A1    Aug. 14, 2008

Related U.S. Application Data

(63) Continuation of application No. 10/541,688, filed as application No. PCT/JP2004/003455 on Mar. 16, 2004, now abandoned.

(30) Foreign Application Priority Data

May 22, 2003   (JP)   ............................ 2003-145019

(51) Int. Cl.
 *H01B 1/04* (2006.01)
 *H01B 1/18* (2006.01)
 *H01M 10/44* (2006.01)
 *H01M 2/08* (2006.01)

(52) U.S. Cl. .................. 252/502; 252/500; 252/510; 252/511; 429/55; 429/174; 429/185

(58) Field of Classification Search ............... 252/500, 252/502, 510, 511; 429/55, 174, 185
See application file for complete search history.

(56) References Cited

U.S. PATENT DOCUMENTS 3,931,097 A *  1/1976  Fujio et al. .................. 524/88

\* cited by examiner

*Primary Examiner*—Mark Kopec
*Assistant Examiner*—Jaison P Thomas
(74) *Attorney, Agent, or Firm*—Butzel Long

(57) ABSTRACT

A seal molding material for cell electrolytic solution, which comprises an EPDM composition comprising a peroxide-crosslinkable EPDM and an organic peroxide, the seal molding material being for use at the electrode site of a nickel-hydrogen cell, wherein the EPDM composition comprises preferably 100 parts by weight of a peroxide-crosslinkable EPDM, 10 to 150 parts by weight of a filler and 1 to 8 parts by weight of an organic peroxide, and not more than 40 parts by weight of hydrocarbon-based oil can be further contained. The seal material molded from the seal molding material for cell electrolytic solution has a sufficient durability against a potassium hydroxide-based electrolytic solution and a longer life, and is free from any deterioration, when energized at the electrode site of a nickel-hydrogen cell.

8 Claims, 1 Drawing Sheet

SEAL MOLDING MATERIAL FOR CELL ELECTROLYTIC SOLUTION

RELATED APPLICATIONS

The present application is a continuation of U.S. patent application Ser. No. 10/541,688, filed Apr. 18, 2006 which is a 35 U.S.C. §371 national stage filing of International Patent Application No. PCT/JP2004/JP2004/003455, filed Mar. 16, 2004, to which priority is claimed under 35 U.S.C. §120 and through which priority is claimed under 35 U.S.C. §119 to Japanese Priority Patent Application No. 2003-145019, filed May 22, 2003. The present application claims priority to U.S. patent application Ser. No. 10/541,688 under 35 U.S.C. §120, now abandoned.

TECHNICAL FIELD

The present invention relates to a seal molding material for cell electrolytic solution, and more particularly to a seal molding material for cell electrolytic solution suitable for use as a molding material of seal material for cell electrolytic solution at the electrode site of nickel-hydrogen cell, particularly car mounting-type nickel-hydrogen cell.

BACKGROUND ART

Seal materials for potassium hydroxide-based electrolytic solution now in use for cells, particularly nickel-hydrogen cells, are mainly composed of hydrogenerated nitrile rubber. However, the hydrogenerated nitrile rubber has not satisfied yet the recent demand for longer life because of higher deterioration rate by the electrolytic solution. Furthermore, the seal materials for use at the electrode site of the nickel-hydrogen cell have a problem of energized deterioration.

DISCLOSURE OF THE INVENTION

An object of the present invention is to provide a seal molding material for cell electrolytic solution, which has a sufficient durability against a potassium hydroxide-based cell electrolytic solution and a longer life, and is free any deterioration, when energized at the electrode site of the nickel-hydrogen cell.

Such an object of the present invention can be attained by a seal molding material for cell electrolytic solution for use at the electrode site of a nickel-hydrogen cell, which comprises an EPDM composition comprising a peroxide-crosslinkable EPDM and an organic peroxide, preferably a seal molding material for use at the electrode site of a nickel-hydrogen cell, which comprises an EPDM composition comprising 100 parts by weight of a peroxide-crosslinkable EPDM, 10 to 150 parts by weight of a filler and 1 to 8 parts by weight of an organic peroxide. The molding material can further contain not more than 40 parts by weight of a hydrocarbon-based oil.

The peroxide-crosslinkable EPDM for use in the present invention includes EPDM having a Mooney viscosity $ML_{1+4}(100°\,C.)$ of 25 to 80, where as the diene component of EPDM any diene component, for example, at least one of ethylidenenorbornene, dicyclopentadiene, 1,4-hexadiene, etc. can be used. When the Mooney viscosity is less than 25, the practical strength will be hard to obtain, whereas when the Mooney viscosity is higher than 80, the kneading work will be hard to conduct. In practice, commercially available products, for example, EP series of JSR products, Mitsui EPT series of Mitsui Chemical products, etc. can be used as such.

Any fillers including a reinforcing agent can be added to EPDM. To maintain a good energized immersion durability, it is preferable to use carbon black. Carbon black having any desired particle sizes can be used in a proportion of 10 to 150 parts by weight, preferably 30 to 140 parts by weight, on the basis of 100 parts by weight of EPDM. When the proportion of carbon black is less than 10 parts by weight, the resulting moldings will have no satisfactory strength, whereas above 150 parts by weight the resulting moldings will have a low energized immersion durability. Other fillers than carbon black include white carbon, talc, clay, graphite, calcium silicate, etc. and are used also in the same proportion as above.

Any organic peroxide can be used without any particular limitation as a cross-linking agent for the peroxide-crosslinkable EPDM, so far as it can be used usually for rubber, and includes, for example, t-butyl peroxide, dicumyl peroxide, t-butyl cumyl peroxide, 1,1-di(t-butylperoxy)-3,3,5-tri-methylcyclohexane, 2,5-dimethyl-2,5-di(t-butylperoxy)hexane, 2,5-dimethyl-2,5-di(t-butylperoxy)hexine-1,1,3-di(t-butylperoxyisopropyl)benzene, 2,5-dimethyl-2,5-di(benzoylperoxy)hexane, t-butylperoxy benzoate, t-butylperoxyisopropyl carbonate, n-butyl-4,4-di(t-butylperoxy)valerate, etc. These organic peroxides are used in a proportion of 1 to 8 parts by weight, preferably 2 to 6 parts by weight, on the basis of 100 parts by weight of EPDM. When the proportion of organic peroxide is less than 1 part by weight, the resulting moldings will have no satisfactory cross-linking density, whereas above 8 parts by weight, foaming will take place, so no satisfactory cross-linked moldings will be obtained, or if obtained, their rubber elasticity or elongation will be lowered.

Other rubber compounding ingredients usually used in the rubber industry such as an acid acceptor, e.g. zinc oxide, magnesium oxide, calcium hydroxide, hydrotalcite, etc.; a processing aid, e.g. stearic acid, palmitic acid, paraffin wax, etc.; an antioxidant, e.g. polymerized (2,2,4-trimethyl-1,2-dihydroquinoline), 2-mercaptobezimidazole, etc.; a plasticizer; a polyfunctional unsaturated compound, e.g. triallyl isocyanurate, triallyl cyanurate, etc. or the like are added to the molding material (composition) containing the foregoing essential components, if required.

Particularly, addition of hydrocarbon-based oil can increase a proportion of carbon black to be added as a reinforcing agent, thereby effectively improving characteristics such as elongation, etc. The hydrocarbon-based oil includes paraffinic process oil, naphthenic process oil, etc., and is used in a proportion of not more than 40 parts by weight, preferably 2 to 20 parts by weight, on the basis of 100 parts by weight of EPDM.

The EPDM composition can be prepared by kneading through a kneading machine such as intermix, kneader, Banbury mixer, etc. or open rolls or both two, and by cross-linking with heating usually at about 150° to about 200° C. for about 1 to about 60 minutes through an injection molding machine, a compression molding machine, a vulcanization press, etc. or, if required, by secondary cross-linking with heating at about 120° to about 200° C. for about 1 to about 24 hours.

BEST MODE FOR CARRYING OUT THE INVENTION

Figure 1:
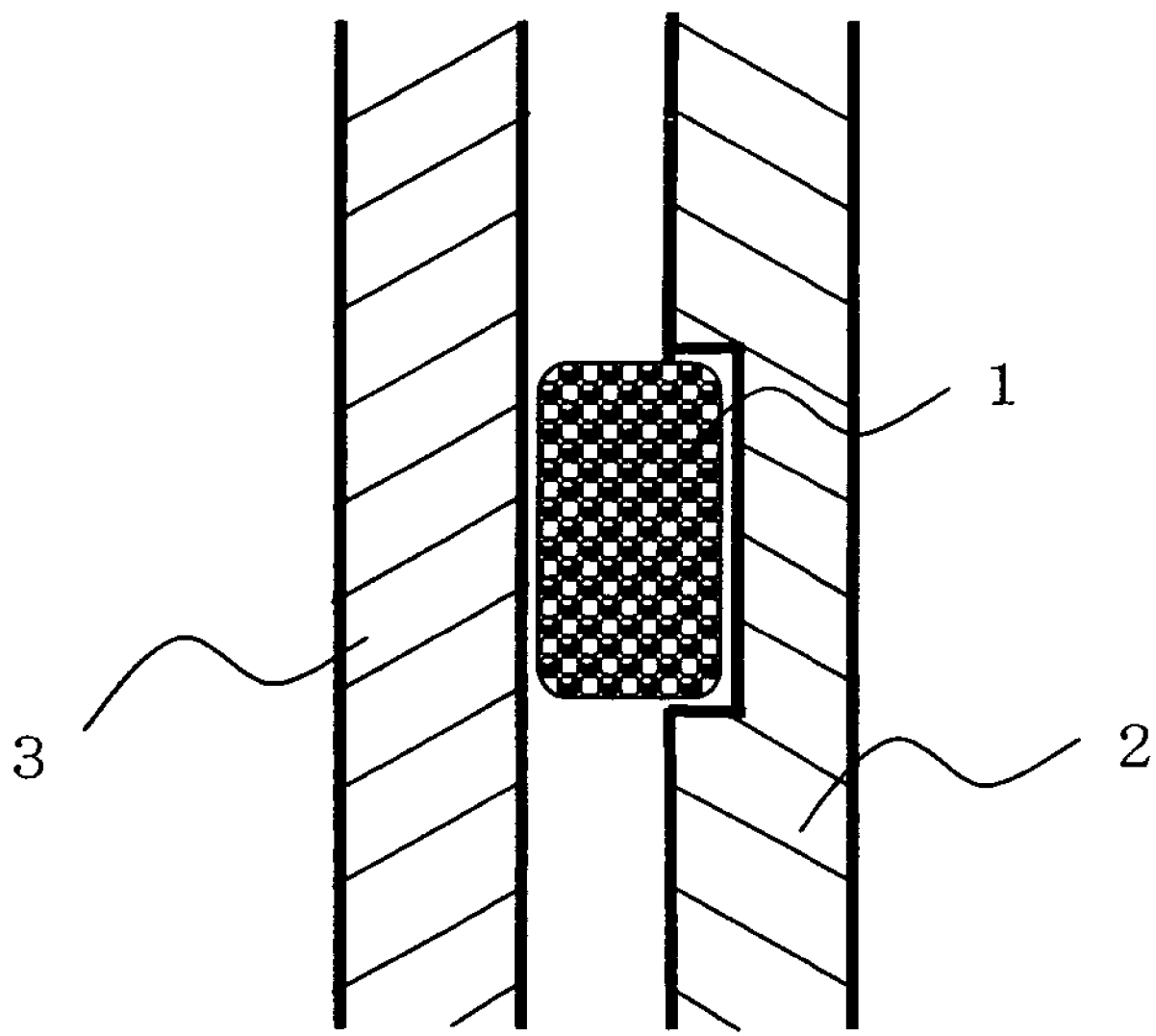
FIG. 1 is a cross-sectional view showing the electrode site and its neighborhood of a nickel-hydrogen cell, using an O-ring molded from the present seal molding material, where numeral 1 denotes an O-ring, 2 a polypropylene plate, and 3 Ni plating Fe plate.

The present invention will be described below, referring to Examples.

Example 1

|  | Parts by weight |
|---|---|
| EPDM (EP22, a product of JSR; Mooney viscosity: 42) | 100 |
| Carbon black (Seast 116, a product of Tokai Carbon Co., Ltd.) | 50 |
| Zinc oxide | 5 |
| Polymerized (2,2,4-trimethyl-1,2-dihydroquinone) | 0.5 |
| 2-mercaptobenzoimidazole | 2 |
| Dicumyl peroxide | 3 |

The foregoing components were kneaded through a kneader and open rolls, and the resulting kneading product was subjected to press cross-linking at 170° C. for 20 minutes and then to oven cross-linking (secondary cross-linking) at 160° C. for 10 hours to obtain a vulcanization sheet (150× 150×2 mm) and a P-14 sized O-ring.

Example 2

In Example 1, the same amount of another EPDM (EPT3070, a product of Mitsui Chemical Co., Ltd.; Mooney viscosity: 69) was used as EPDM.

Example 3

In Example 1, 100 parts by weight of another carbon black (Seast TA, a product of Tokai Carbon Co., Ltd.) was used as carbon black.

Example 4

In Example 1, the amount of carbon black was changed to 60 parts by weight, and 10 parts by weight of paraffinic oil (PW380, a product of Idemitsu Kosan Co., Ltd.) was further used.

Example 5

In Example 1, 30 parts by weight of another carbon black (Seast 3, a product of Tokai Carbon Co., Ltd.) was used as carbon black.

Example 6

In Example 5, the amount of carbon black was changed to 70 parts by weight.

Example 7

In Example 1, the same amount of white carbon (Nipsil LP, a product of Nippon Silica Co., Ltd.) was used in place of carbon black.

Example 8

In Example 1, 140 parts by weight of another carbon black (Seast TA) was used as carbon black.

Comparative Example 1

In Example 1, the same amount of hydrogenated nitrile rubber (Zetpol 2020, a product of Nippon Zeon Co., Ltd.) was used in place of EPDM, and the amount of dicumyl peroxide was changed to 6 parts by weight. Furthermore, 10 parts by weight of ester-based oil (RS735, a product of Asahi Denka Kogyo K.K.) was used.

Comparative Example 2

|  | Parts by weight |
|---|---|
| Vinylidene fluoride-hexafluoropropene-based-fluoroelastomer (Daiel G716, a product of Daikin Industries, Ltd.) | 100 |
| Carbon black (Thermax N990, a product of CANCARB) | 20 |
| Calcium hydroxide (Caldic #2000, a product of Ohmi Kagaku K.K.) | 6 |
| Magnesium oxide (Kyowa mag #150, a product of Kyowa Kagaku K.K.) | 3 |

The foregoing components were subjected to the same kneading and cross-linking as in Example 1.

Comparative Example 3

|  | Parts by weight |
|---|---|
| Vinylidene fluoride-tetrafluoroethylene-perfluoro-(methyl vinyl ether) based fluoroelastomer (GLT305, a product of DuPont Co.) | 100 |
| Carbon black (Thermax N990) | 30 |
| Calcium hydroxide (Caldic #2000) | 4 |
| Triallyl isocyanurate (TAIC, a product of Nihon Kasei K.K.) | 4 |
| 2,5-dimethyl-2,5-di(t-butylperoxy)hexane (Perhexa 25B, a product of NFO Corp.) | 1.2 |

The foregoing components were subjected to the same kneading and cross-linking as in Example 1.

Cross-linked sheets and O-rings obtained in the foregoing Examples and Comparative Examples were subjected to tests according to the following test items:

Normal state physical properties: according to JIS K6253 and K6251

Compression set: according to JIS K6262 (150° C. for 70 hours)

Volume resistivity: according to JIS K6271 double ring electrode procedure (applied voltage: 1 kV)

Kneadability: evaluated as best ⊙, good ◯, some what poor Δ and poor X

Electrolytic solution durability: (a) when P-24 O-rings are simply immersed in an aqueous 30 wt. % potassium hydroxide solution at 70° C. for 200 hours, 1,000 hours or 2,000 hours, or at 100° C. for 200 hours, 500 hours or 1,000 hours, or (b) when P-24 O-rings, each sandwiched between a pair of metal plates (+ electrodes), together with other metal plate (− electrode), are immersed into an aqueous 30 wt. % potassium hydroxide solution at 70° C. upon energization at 1.3V for 500 hours or 1,000 hours, or at 3.0V for 100 hours or 500 hours, or at 4.5V for 20 hours or 100 hours, surface deterioration states of O-rings are visually observed and evaluated as normal ○, small surface roughening (as finger tips become black upon touching) □, medium surface roughening (visible) Δ, large surface roughening X, and hardened deterioration ●, where the mark − designates no testing It has been found that the deterioration state in the cell is reproducible by energization with DC current while the seal materials are immersed in the electrolytic solution, and thus the rubber life has been predictable The results are shown in the following Table 1 (Examples) and Table 2 (Comparative Examples). It can be seen from the results that:

(1) Moldings of Examples 1 to 8 have an electrolytic solution durability, moreover those of Examples 1, 2 and 4 with a good balance with physical properties have a satisfactory durability in the energized immersion tests at high voltages (3.0V and 4.5V), (2) Molding of Comparative Example 1 has no durability in the energized immersion test at a low voltage (1.3V), and (3) Moldings of Comparative Examples 2 to 3 have no durability in the simple immersion test.

TABLE 2

| Test Items | Comp. Ex. No. 1 | 2 | 3 |
|---|---|---|---|
| [Normal state physical properties] | | | |
| Hardness (Durometer A) | 70 | 71 | 75 |
| Tensile strength (MPa) | 28.5 | 15.3 | 18.5 |
| Elongation (%) | 250 | 230 | 190 |
| [Compression set] | | | |
| 150° C. for 70 hr (%) | 15 | 21 | 24 |
| [Volume resistivity] | | | |
| $\rho$ ($\Omega \cdot$ cm) | 1 × E9 | 1 × E11 | 1 × E11 |
| [Kneadability] | | | |
| Evaluation | ○ | ○ | ○ |
| [Electrolytic solution durability] | | | |
| Simple immersion (a) | | | |
| 70° C. for 200 hrs | ○ | ● | ● |
| for 1,000 hrs | ○ | — | — |
| for 2,000 hrs | Δ | — | — |
| 100° C. for 200 hrs | ○ | — | — |
| for 500 hrs | Δ | — | — |
| for 1,000 hrs | □ | — | — |

TABLE 1

| Test Items | Example No. 1 | 2 | 3 | 4 | 5 | 6 | 7 | 8 |
|---|---|---|---|---|---|---|---|---|
| [Normal state physical properties] | | | | | | | | |
| Hardness (Durometer A) | 70 | 71 | 70 | 71 | 73 | 81 | 75 | 80 |
| Tensile strength (MPa) | 19.1 | 21.3 | 15.5 | 18.3 | 17.6 | 6.1 | 18.7 | 14.3 |
| Elongation (%) | 220 | 230 | 200 | 250 | 150 | 60 | 220 | 130 |
| [Compression set] | | | | | | | | |
| 150° C. for 70 hr (%) | 14 | 13 | 25 | 18 | 35 | 28 | 27 | 28 |
| [Volume resistivity] | | | | | | | | |
| $\rho$ ($\Omega \cdot$ cm) | 1 × E10 | 1 × E10 | <1 × E9 | 2 × E10 | 1 × E11 | 1 × E9 | 3 × E16 | <1 × E9 |
| [Kneadability] | | | | | | | | |
| Evaluation | ○ | ○ | Δ | ◎ | Δ | ○ | Δ | Δ |
| [Electrolytic solution durability] | | | | | | | | |
| Simple immersion (a) | | | | | | | | |
| 70° C. for 200 hrs | ○ | ○ | ○ | ○ | ○ | ○ | ○ | ○ |
| for 1,000 hrs | ○ | ○ | ○ | ○ | ○ | ○ | ○ | ○ |
| for 2,000 hrs | ○ | ○ | □ | ○ | □ | ○ | ○ | □ |
| 100° C. for 200 hrs | ○ | ○ | ○ | ○ | ○ | ○ | ○ | ○ |
| for 500 hrs | ○ | ○ | ○ | ○ | □ | □ | ○ | ○ |
| for 1,000 hrs | ○ | ○ | □ | ○ | □ | □ | Δ | □ |
| Energized immersion (b) | | | | | | | | |
| 1.3 V for 500 hrs | ○ | ○ | ○ | ○ | ○ | ○ | ○ | ○ |
| for 1,000 hrs | ○ | ○ | ○ | ○ | □ | ○ | □ | □ |
| 3.0 V for 100 hrs | ○ | ○ | ○ | ○ | ○ | ○ | □ | □ |
| for 500 hrs | ○ | ○ | □ | ○ | □ | □ | X | Δ |
| 4.5 V for 20 hrs | ○ | ○ | ○ | ○ | ○ | ○ | □ | □ |
| for 100 hrs | ○ | ○ | □ | ○ | □ | □ | X | X |

TABLE 2-continued

| | Comp. Ex. No. | | |
|---|---|---|---|
| Test Items | 1 | 2 | 3 |
| Energized Immersion (b) | | | |
| 1.3 V for 500 hrs | □ | — | — |
| for 1,000 hrs | X | — | — |
| 3.0 V for 100 hrs | Δ | — | — |
| for 500 hrs | X | — | — |
| 4.5 V for 20 hrs | X | — | — |
| for 100 hrs | — | — | — |

INDUSTRIAL UTILITY

The present seal molding material for the cell electrolytic solution can give a seal material for the cell electrolytic solution with a distinguished durability against cell electrolytic solution usually based on an aqueous potassium hydroxide solution. Electrode site of the nickel-hydrogen cell has a problem of energized deterioration, and the seal material made by cross-linking molding of the present seal molding material has a distinguished energized immersion durability when used as a seal material not at the cell outside, but at the electrode site under continuous application of voltages. Thus, the seal material can be suitably used for O-rings, gaskets, packings, oil seals, lip seals, etc. for use in cells, particularly in nickel-hydrogen cells in cars, backup electric sources, electric tools, etc.

The invention claimed is:

1. A cell having a sealing element and containing an electrolyte solution, said sealing element formed from a molding material that is resistant to deterioration caused by the electrolyte solution, said molding material comprising an EPDM composition that includes 100 parts by weight of a peroxide-crosslinkable EPDM, 10 to 150 parts by weight of a filler which consists of carbon black and 1 to 8 parts by weight of an organic peroxide.

2. A cell according to claim 1, wherein the EPDM composition has a Mooney viscosity $ML_{1+4}(100°\ C.)$ of 25 to 80.

3. A cell according to claim 1, wherein the EPDM composition further comprises up to 40 parts by weight of hydrocarbon-based oil.

4. A cell according to claim 1, wherein the cell comprises a nickel-hydrogen cell.

5. A cell according to claim 1, wherein the electrolyte solution comprises a potassium hydroxide-based electrolytic solution.

6. A cell according to claim 1, wherein the cell is energized by a DC current.

7. A cell according to claim 4 wherein the sealing element is used at an electrode site of a nickel-hydrogen cell.

8. A cell according to claim 4, wherein the electrolyte solution comprises a potassium hydroxide-based electrolytic solution.

* * * * *